US008464469B2

(12) United States Patent
Oberheide

(10) Patent No.: US 8,464,469 B2
(45) Date of Patent: Jun. 18, 2013

(54) BELT DRIVEN POWER SLIDING DOOR WITH BELT TENSIONER

(75) Inventor: G. Clarke Oberheide, Troy, MI (US)

(73) Assignee: Magna Closures Inc., Newmarket (CA)

( * ) Notice: Subject to any disclaimer, the term of this patent is extended or adjusted under 35 U.S.C. 154(b) by 517 days.

(21) Appl. No.: 12/532,244

(22) PCT Filed: Mar. 19, 2008
(Under 37 CFR 1.47)

(86) PCT No.: PCT/CA2008/000532
§ 371 (c)(1),
(2), (4) Date: Jun. 11, 2010

(87) PCT Pub. No.: WO2008/113178
PCT Pub. Date: Sep. 25, 2008

(65) Prior Publication Data

US 2010/0312395 A1 Dec. 9, 2010

Related U.S. Application Data

(60) Provisional application No. 60/896,005, filed on Mar. 21, 2007.

(51) Int. Cl.
*G05B 15/02* (2006.01)
*E05F 15/14* (2006.01)

(52) U.S. Cl.
USPC .......... 49/360; 296/155

(58) Field of Classification Search
USPC .......... 49/360; 296/155; 318/264–266, 318/272, 275, 277, 282, 286, 466–469, 626
See application file for complete search history.

(56) References Cited

U.S. PATENT DOCUMENTS

| | | | | |
|---|---|---|---|---|
| 5,069,000 | A * | 12/1991 | Zuckerman | 49/28 |
| 5,168,666 | A | 12/1992 | Koura et al. | |
| 5,551,190 | A | 9/1996 | Yamagishi et al. | |
| 5,755,059 | A | 5/1998 | Schap | |
| 5,755,468 | A | 5/1998 | Buchanan, Jr. | |
| 6,108,976 | A * | 8/2000 | Kato et al. | 49/360 |
| 6,150,732 | A | 11/2000 | Ronitz et al. | |
| 6,226,925 | B1 * | 5/2001 | Shimura et al. | 49/360 |
| 6,328,374 | B1 * | 12/2001 | Patel | 296/155 |
| 6,341,448 | B1 | 1/2002 | Murray et al. | |
| 6,502,352 | B1 * | 1/2003 | Bonduel | 49/26 |

(Continued)

FOREIGN PATENT DOCUMENTS

WO 2008015300 2/2008

*Primary Examiner* — Katherine Mitchell
*Assistant Examiner* — Justin Rephann
(74) *Attorney, Agent, or Firm* — Miller Canfield

(57) ABSTRACT

A power drive system for a sliding door on a motor vehicle includes a guide track fixedly secured to the vehicle. A motor fixedly secured to the track is adapted to receive power. The motor converts the power into a rotational force. A set of pulleys and wheels are fixedly secured to the track to direct the path of a belt. The belt extends between first and second ends which are operatively coupled to the door and move relative to each other as the motor drives the belt to move the door between open and close positions. Upon manual movement of the door, relative movement between the first and second ends of the belt is sensed by sensors. The sensors create a feedback signal received by an electronic controller which operates the motor to overcome a motor back-driving force and belt friction forces created during manual movement of the door.

8 Claims, 6 Drawing Sheets

U.S. PATENT DOCUMENTS

| | | | | |
|---|---|---|---|---|
| 6,588,829 | B2 | 7/2003 | Long et al. | |
| 6,802,154 | B1 * | 10/2004 | Holt et al. | 49/26 |
| 6,866,250 | B2 | 3/2005 | Kita | |
| 6,904,717 | B2 | 6/2005 | Clark et al. | |
| 7,032,349 | B2 | 4/2006 | Oberheide et al. | |
| 7,144,068 | B2 | 12/2006 | Oxley et al. | |
| 2003/0089042 | A1 * | 5/2003 | Oberheide et al. | 49/360 |
| 2003/0140563 | A1 * | 7/2003 | Oberheide | 49/360 |
| 2003/0140565 | A1 * | 7/2003 | Otomo et al. | 49/360 |
| 2004/0016181 | A1 * | 1/2004 | Yokomori et al. | 49/360 |
| 2004/0221510 | A1 * | 11/2004 | Fukumoto et al. | 49/360 |
| 2004/0221511 | A1 | 11/2004 | Rogers, Jr. et al. | |
| 2005/0055883 | A1 * | 3/2005 | Sato et al. | 49/360 |
| 2006/0042168 | A1 * | 3/2006 | Yamada et al. | 49/360 |
| 2006/0112643 | A1 * | 6/2006 | Yokomori et al. | 49/360 |
| 2006/0113821 | A1 | 6/2006 | Yokomori et al. | |
| 2006/0137250 | A1 * | 6/2006 | Imai et al. | 49/360 |
| 2006/0137252 | A1 * | 6/2006 | Kriese et al. | 49/360 |
| 2006/0150515 | A1 * | 7/2006 | Shiga | 49/360 |
| 2006/0225358 | A1 | 10/2006 | Haag et al. | |

* cited by examiner

BELT DRIVEN POWER SLIDING DOOR WITH BELT TENSIONER

BACKGROUND OF THE INVENTION

1. Field of the Invention

The present invention relates to power drive systems, and more particularly to a power drive system for a sliding door which in response to manual movement by a user operates an electric motor to overcome forces created during the manual movement of the sliding door.

2. Description of Related Art

In various types of automotive vehicles, including minivans, delivery vans, and the like, it has become common practice to provide a vehicle body with relatively large side openings that are located immediately behind front doors and which are opened and closed with a sliding side door. The sliding side door is typically mounted with upper and lower hinge members to horizontal tracks on the vehicle body for guided sliding movement between a close position flush with the vehicle body, closing the side opening, and an open position located outward of and alongside the vehicle body rearward of the side opening. The sliding side door may be operated manually or with a power drive system to which the present invention is directed.

Examples of conventional power drive systems for automatically opening and closing the sliding side door are described in U.S. Pat. Nos. 6,481,783; 6,464,287; 6,435,600; 6,256,930; 6,079,767; 5,833,301; 5,644,869; 5,536,061; 5,434,487; 5,203,112; 5,168,666; and 4,612,729. Various power drive systems utilize a cable, chain, or belt to open and close the sliding side door. For example, U.S. Pat. No. 5,168,666 discloses a door drive device which includes a guide rail in a vehicle body defining a path along which a side door moves. An endless belt extends around first and second pulleys which are arranged at spaced positions within the vehicle body. A bracket is provided for connecting a portion of the endless belt to the side door and a reversible electric motor drives the first pulley thereby moving the side door between an open position and a close position.

Commonly assigned U.S. Pat. No. 7,032,349, which is hereby incorporated by reference as if fully set forth herein, discloses a door drive system including a frame fixedly secured to a motor vehicle. A motor is fixedly secured to the frame and adapted to convert power into a rotational output force. The motor includes a non-ferrous core. A set of pulleys and rollers are fixedly secured to the frame at predetermined positions to direct the path of a continuous belt. The belt is fixedly secured to a sliding door such that the motor moves the belt and the sliding door bi-directionally between an open position and a close position. Sensors are used to determine the position of the sliding door, the speed thereof and whether the sliding door is being moved manually. The sensors may be used to detect the presence of a back-driving force in an interfacing transmission between the motor and the belt. Once sensed, the information is transmitted to an electronic controller allowing it to operate the motor. In this manner, the motor would be operated to keep up with the movement of the sliding door eliminating the need for the operator to manually overcome the losses due to the motor and the interfacing transmission.

It remains desirable, however, to provide a power drive system including a simple and robust differential belt tensioner operatively coupled between the belt and the sliding door. It is also desirable to provide sensors for sensing movement of the belt during manual movement of the sliding door and sending a signal based on sensing this belt movement to operate a motor to overcome forces resulting from the manual movement of the sliding door. It is further desirable to operate the motor to provide force assist to further reduce efforts during the manual movement of the sliding door.

SUMMARY OF THE INVENTION

According to one aspect of the invention, a power drive system for moving a sliding door includes at least one sensor for detecting movement of a drive member during manual movement of the sliding door, the sensor sending a signal to operate a motor to overcome forces resulting from manual movement of the sliding door.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
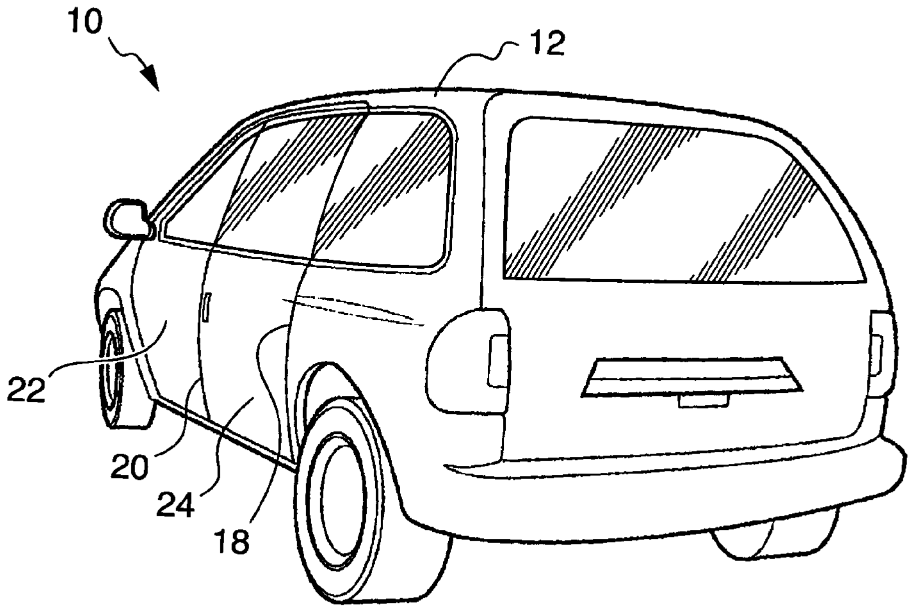
FIG. 1 is a perspective view of an automotive vehicle equipped with a power drive system for opening and closing a sliding side door according to one aspect of the invention.
Figure 2:
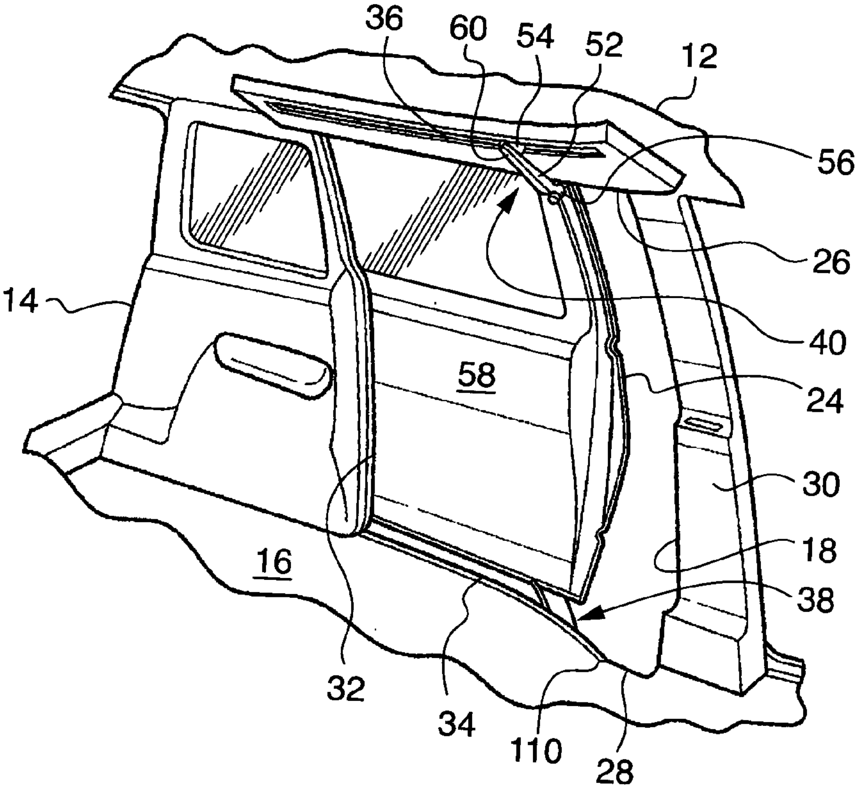
FIG. 2 is a fragmentary, perspective view of an interior passenger compartment of the vehicle illustrated in FIG. 1.

Referring to FIGS. 1 and 2, an automotive vehicle of a minivan type is generally shown at 10. The vehicle 10 includes a body 12 defining an interior passenger compartment 14 with a floor 16, and a rear side opening 18 positioned on a left side of the vehicle 10 immediately rearward of a front side opening 20. The front 20 and rear 18 side openings provide access to respective front and rear areas of the passenger compartment 14. The front side opening 20 is opened and closed by a front door 22 that is mounted in a conventional manner on the vehicle body 12 for pivotal movement about a vertical axis at a forward edge of the door 22. The rear side opening 18 is substantially larger than the front side opening 20, and is opened and closed by a sliding side door 24. Although not shown in the Figures, it will be understood that the vehicle body 12 may be equipped with a substantially identical sliding side door on a right side thereof. Additionally, it will be appreciated by those skilled in the art that the teachings of the present invention will have applicability to other vehicle types and closure styles.

The rear side opening 18 is defined by an upper edge 26, a lower edge 28, a first body pillar 30, and a second body pillar

32. A lower guide track 34 is disposed in the floor 16 adjacent the lower edge 28 and extends therealong. Similarly, a conventional upper guide track 36 is disposed adjacent the upper edge 26 and extends therealong. The sliding door 24 is slidably mounted to the lower guide track 34 with a lower mounting assembly, generally indicated at 38, and to the upper guide track 36 with an upper mounting assembly, generally indicated at 40, for bi-directional movement between an open position and a close position. In the open position, the sliding door 24 substantially clears the rear side opening 18 and is disposed rearward thereof. In the close position, the sliding door 24 substantially covers the rear side opening 18.

Figure 4:
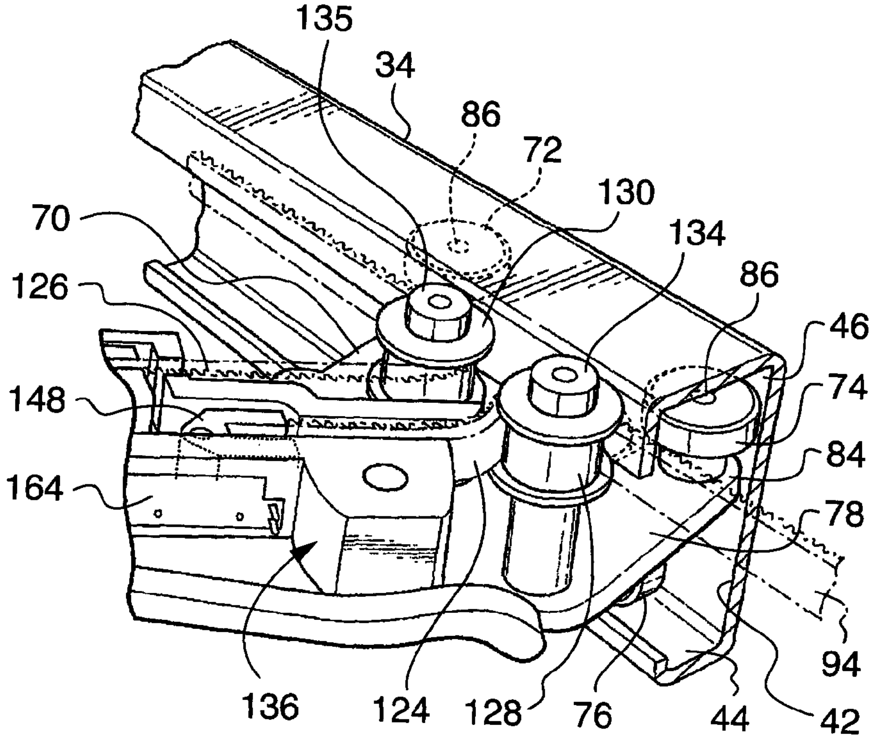
FIG. 4 is a fragmentary, top perspective view of a lower mounting assembly coupled to the guide track.
Figure 5:
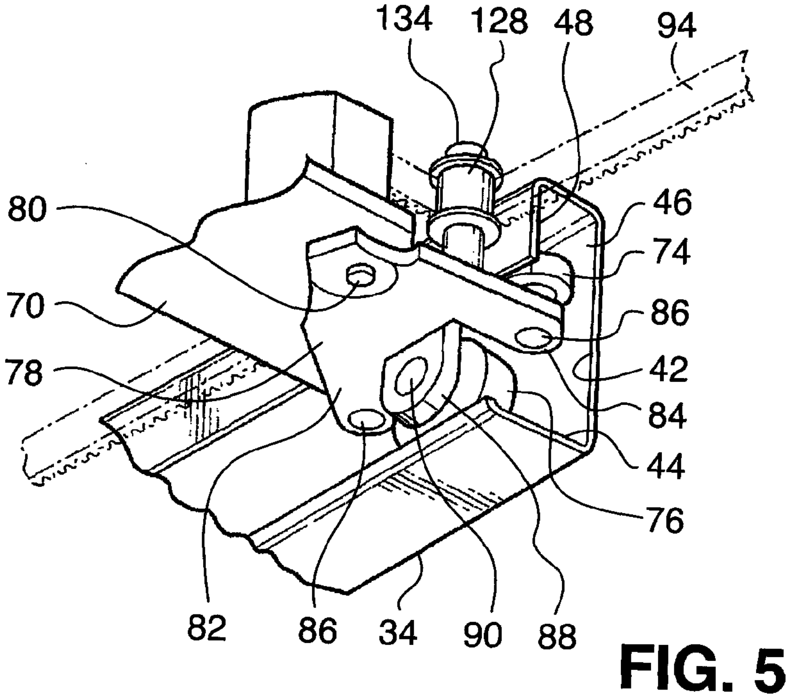
FIG. 5 is a fragmentary, bottom perspective view of the lower mounting assembly coupled to the guide track.

The lower guide track 34 is shown to curve inward relative to the passenger compartment 14 of the vehicle body 12 as it approaches the first body pillar 30. Referring to FIGS. 4 and 5, the lower guide track 34 includes a channel portion 42 having a vertical guide surface 44, shown in FIG. 4, and opposing first and second horizontal guide surfaces 46, 48, shown in FIG. 5. The upper guide track 36 also is shown to curve inward relative to the passenger compartment 14 of the vehicle body 12 as it approaches the first body pillar 30, as shown in FIG. 2.

Referring to FIG. 2, the upper mounting assembly 40 is mounted to an upper forward corner of the sliding door 24. The upper mounting assembly 40 includes an upper hinge member 52 and an upper guide roller 54. A first end 56 of the upper hinge member 52 is fixedly secured to an interior side 58 of the sliding door 24, and the upper guide roller 54 is rotatably coupled to a second end 60 of the upper hinge member 52. The upper guide roller 54 is adapted for rolling engagement with the upper guide track 36.

Figure 3:
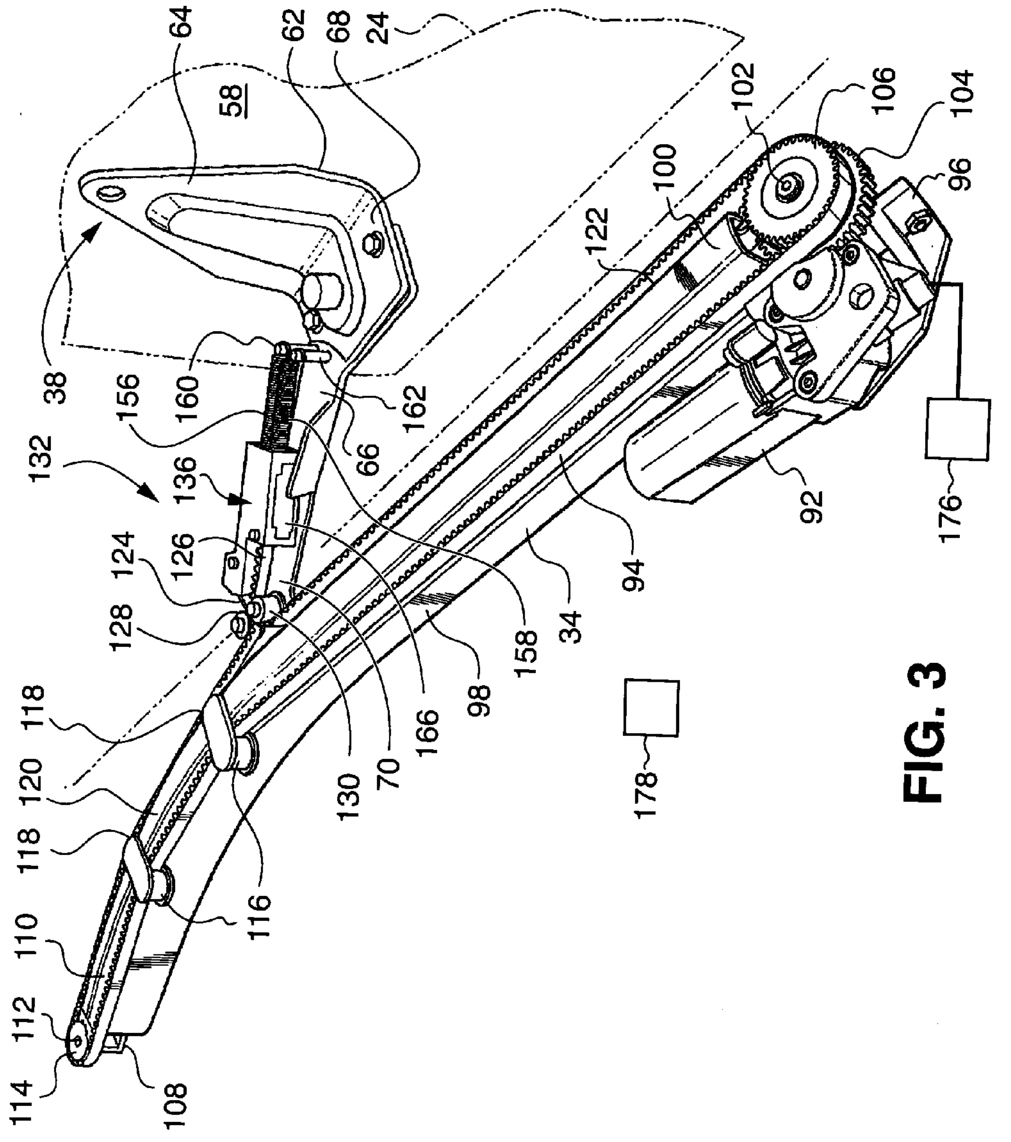
FIG. 3 is a perspective view of a lower mounting assembly mounted to an interior side of the sliding side door and operatively coupled to a guide track.

Referring to FIG. 3, the lower mounting assembly 38 is mounted to a lower forward corner of the sliding door 24. The lower mounting assembly 38 includes a lower hinge member 62 having a first vertical portion 64 and a second horizontal portion 66. The vertical portion 64 is adapted to be fixedly secured to the interior side 58 of the sliding door 24. The horizontal portion 66 extends between a proximal end 68 adjacent the vertical portion 64 and an opposite distal end 70.

Referring to FIGS. 4 and 5, the lower mounting assembly 38 also includes first and second lateral guide rollers 72, 74, a vertical guide roller 76, and an articulating bracket 78. The articulating bracket 78 is pivotally coupled by a pivot pin 80 to the horizontal portion 66 of the lower hinge member 62, at the distal end 70 thereof. The articulating bracket 78 is generally U-shaped, with each end 82, 84 having a cylindrical aperture (not shown) for receiving a vertically extending roller pin 86, each one of which journally supports one of the first and second horizontal guide rollers 72, 74. A tongue 88 extends in a perpendicular direction downward between the ends 82, 84 of the articulating bracket 78 and includes a cylindrical aperture (not shown) for receiving a horizontally extending roller pin 90 which journally supports the vertical guide roller 76.

The lower mounting assembly 38 is adapted for cooperation with the lower guide track 34 wherein the vertical guide roller 76 rollingly engages the vertical guide surface 44, and the first and second horizontal guide rollers 72, 74 rollingly engage the first and second horizontal guide surfaces 46, 48. As such, cooperation between the guide rollers 76, 72, 74 and their respective guide surfaces 44, 46, 48 ensures proper vertical and horizontal alignment of the sliding door 24. Since the articulating bracket 78 is pivotally coupled to the lower hinge member 62, the guide rollers 76, 72, 74 are capable of traversing the curved length of the lower guide track 34.

Referring to FIG. 3, a reversible motor 92 and a flexible belt 94 are provided for automatically moving the sliding door 24 between the open and close positions. More specifically, the motor 92 is fixedly secured to a motor mount bracket 96 which is adapted to mount to an inboard side 98 of the lower guide track 34, at a rear end 100 adjacent the second body pillar 32. The motor 92 is adapted to receive power and converts the power into a rotational output force. A vertical shaft 102 extending from the motor mount bracket 96 journally supports a spur gear 104. The spur gear 104 is operatively coupled to the motor 92 such that the rotational output force rotates the spur gear 104. The vertical shaft 102 also journally supports a toothed drive pulley 106 disposed above and secured to the spur gear 104 such that rotation of the spur gear 104 by the motor 92 also causes the drive pulley 106 to rotate. A bracket 108 is adapted to mount to a front end 110 of the lower guide track 34, adjacent the first body pillar 30. A vertical shaft 112 extending from the bracket 108 journally supports an end wheel or toothed driven pulley 114.

The belt 94 can be any suitable belt including rubber belts with Kevlar or other reinforcements and preferably is a reinforced toothed belt which can carry relatively large tensile loads and which is not generally subject to stretching. The belt 94 follows a curved path along the lower guide track 34 and is disposed around the drive pulley 106 at the rear end 100 and the driven pulley 114 at the front end 110. In the embodiment shown, a pair of inboard guide wheels 116 and a pair of outboard guide wheels 118 are included to maintain the belt 94 along the curved path. The inboard guide wheels 116 trap the belt 94 such that it is adjacent the inboard side 98 of the lower guide track 34 along a curved portion 120 thereof. The outboard guide wheels 118 guide the belt 94 such that it is spaced apart from an outboard side 122 of the lower guide track 34 along the curved portion 120 thereof. The belt 94 extends between a first end 124 and a second end 126. Front and rear belt wrap wheels 128, 130 guide the first and second ends 124, 126 of the belt 94 toward a differential belt tensioner, generally shown at 132, mounted to the horizontal portion 66 of the lower hinge member 62. Referring to FIGS. 4 and 5, the front belt wrap wheel 128 is journally supported by a vertically extending roller pin 134 mounted to the articulating bracket 78. The rear belt wrap wheel 130 is journally supported by a vertically extending roller pin 135 mounted to the horizontal portion 66 of the lower hinge member 62, at the distal end 70 thereof. It is appreciated that the belt 94 could also be any of a variety of elongated flexible drive members such as a cable, chain, or rope for example, without varying from the scope of the invention.

An electronic controller 176 controls the motor 92. It does so by receiving inputs from a motor encoder sensor 178 that determines the position of the belt 94 and the sliding door 24 with respect to the vehicle body 12.

Figure 8:
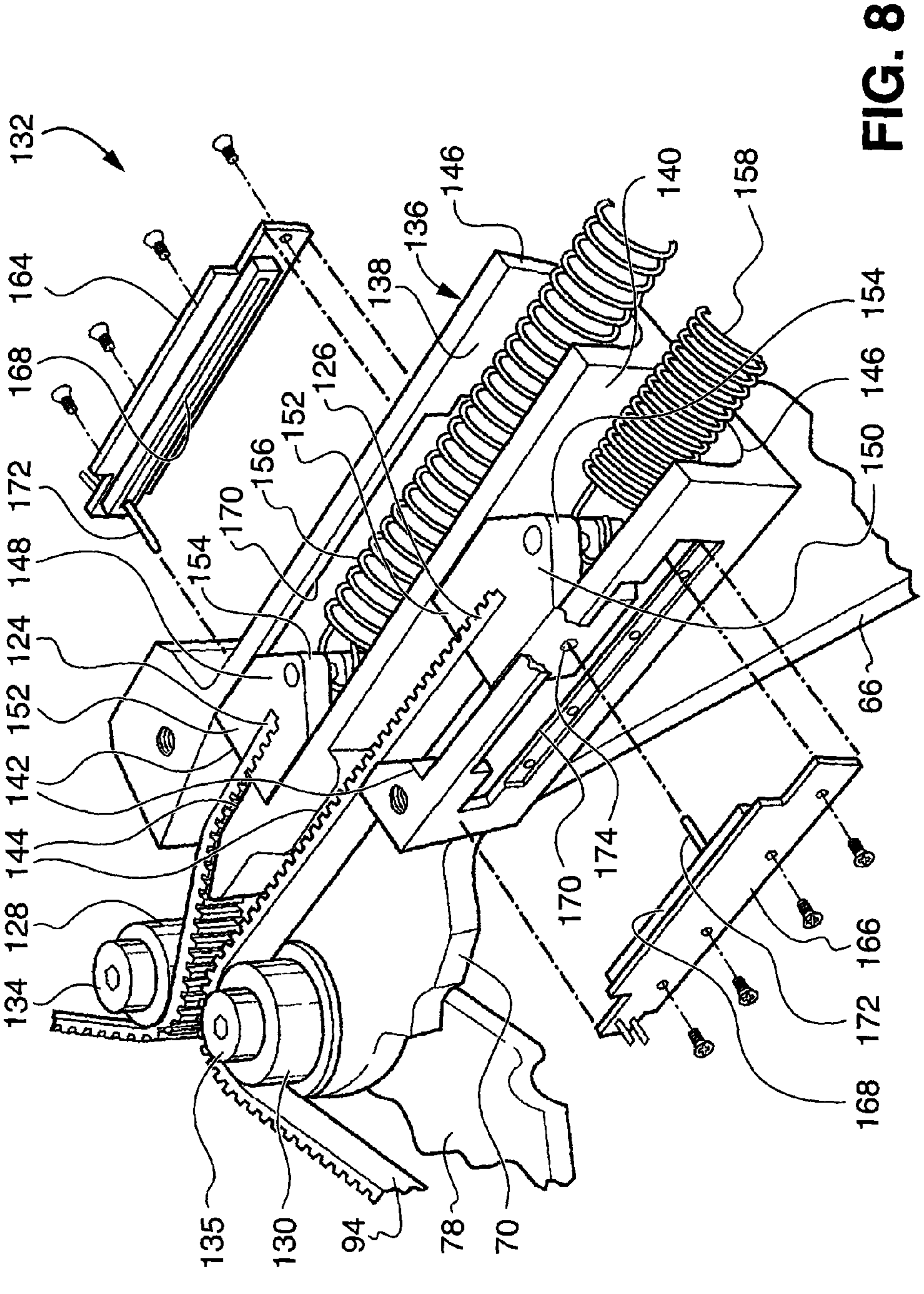
FIG. 8 is a fragmentary, top perspective view of the lower mounting assembly including the differential belt tensioner with a pair of potentiometers exploded away for purposes of illustration.

Referring to FIGS. 3 and 8, the differential belt tensioner 132 is incorporated into the lower hinge member 62 to take up slack in the belt 94 when the sliding door 24 is moved between the open and close positions. The differential belt tensioner 132 includes a housing, generally indicated at 136, fixedly mounted to the horizontal portion 66 of the lower hinge member 62, at the distal end 70 thereof. The housing 136 includes first and second channels 138, 140. Each of the first and second channels 138, 140 extend between a substantially closed end 142 having a slotted opening 144 for guiding the respective first and second ends 124, 126 of the belt 94 into the first and second channels 138, 140, and an opposite open end 146.

Figure 6:
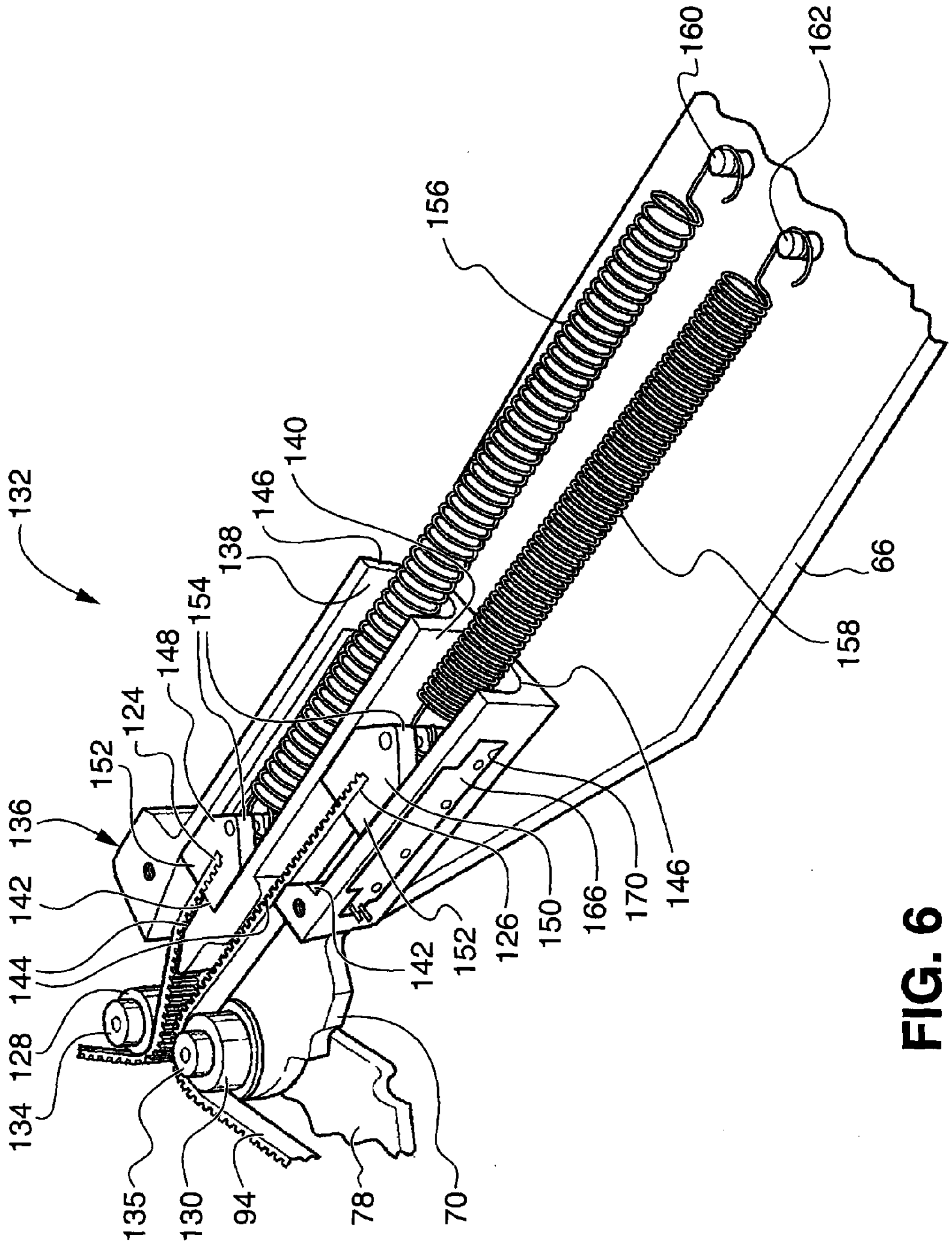
FIG. 6 is a fragmentary, top perspective view of the lower mounting assembly including a differential belt tensioner in a first position.
Figure 7:
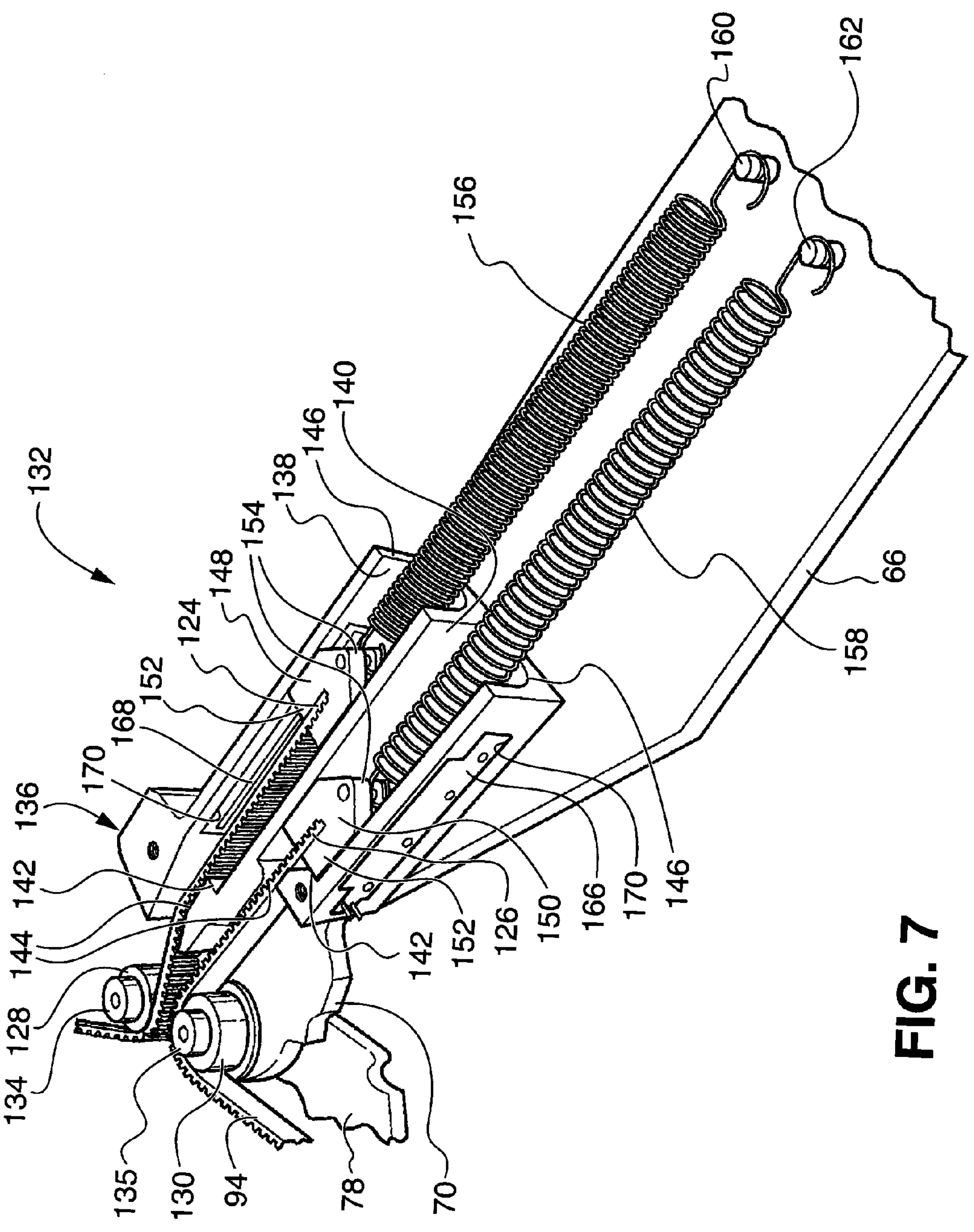
FIG. 7 is a fragmentary, top perspective view of the lower mounting assembly including the differential belt tensioner in a second position.

Referring to FIGS. 6 and 7, an end clamp 148, 150 is slidably disposed within each of the first and second channels 138, 140 and is fixedly secured to the respective first and second ends 124, 126 of the belt 94 for retaining the belt 94 therein. Each end clamp 148, 150 includes a first end 152 clamped to the respective first 124 or second 126 end of the belt 94 and an opposite second end 154. An extension spring 156, 158 extends between the second end 154 of each end clamp 148, 150 and a vertical post 160, 162 fixedly secured to the horizontal portion 66 of the lower hinge member 62, at the proximal end 68 thereof. When the sliding door 24 is stationary the belt 94 is not loaded in either direction and the end clamps 148, 150 are in a balanced position such that the springs 156, 158 are equally extended between the end clamps 148, 150 and the posts 160, 162. However, when the belt 94 is loaded, whether driven by the motor 92 or by moving the sliding door 24 under manual effort, one of the springs 156, 158 extends until the respective end clamp 148, 150 bears on the closed end 142 of the first or second channel 138, 140. At the same time, the other one of the springs 156, 158 shortens to pull the respective end clamp 148, 150 toward the open end 146 of the other of the first or second channel 138, 140, thereby taking up the slack in the belt 94. When one spring 156, 158 is extended more than the other spring 156, 158 the end clamps 148, 150 are in one of a plurality of unbalanced positions wherein the springs 156, 158 are unequally extended between the end clamps 148, 150 and the posts 160, 162.

When the sliding door 24 is manually moved in either direction the user must overcome friction forces generated by the belt 94 as well as a back-driving force of the motor 92. Movement of the belt 94 is sensed by the differential belt tensioner 132. Once sensed, the information is in a manner similar to feedback wherein the information is transmitted back to the electronic controller 176 allowing it to then operate the motor 92. In this manner, the motor 92 is operated to keep up with the movement of the sliding door 24 eliminating the need for the user to manually overcome the losses due to motor drag and the belt friction forces. Thus, the user fells the sliding door 24 as though there is no power drive system. It is also contemplated that the motor 92 could be operated to provide some level of force assist to further reduce the efforts during manual operation of the sliding door 24.

Referring to FIG. 8, the differential belt tensioner 132 uses a pair of conventional sliding-type potentiometers 164, 166 to monitor the movement of the end clamps 148, 150 within each of the first and second channels 138, 140. Each potentiometer 164, 166 includes a linear body 168 mounted along a slot 170 formed in the housing 136 adjacent one of the first and second channels 138, 140, and a laterally extending pin 172 slidably coupled to the linear body 168. The pin 172 extends into an aperture 174 formed in the respective end clamp 148, 150. Therefore, as the end clamps 148, 150 move within the first and second channels 138, 140, the pin 172 slides along the linear body 168 of the respective potentiometer 164, 166. If the end clamps 148, 150 are in one of the plurality of unbalanced positions, this indicates that the sliding door 24 is being manually moved and the electronic controller 176 operates the motor 92 to overcome the motor drag and the belt friction forces. Once the end clamps 148, 150 return to steady state or the balanced position, typically by the user ceasing to move the sliding door 24, the electronic controller 176 stops the motor 92. It is appreciated that the potentiometers 164, 166 could be any of a plurality of switches or sensors sufficient for monitoring the movement of the end clamps 148, 150 in the channels 138, 140.

It is contemplated that the belt 94 could alternatively be disposed on or in the sliding door 24 and fixed to the sliding door 24 while the differential belt tensioner 132 is mounted to the body 12 of the vehicle 10 for movement of the sliding door 24 between the open and close positions. It is also contemplated that rather than sensing movement of the belt 94 using the potentiometers 164, 166, a sensor could be used to detect directional movement of the drive pulley 106 to determine manual movement of the sliding door 24. It is further contemplated that the differential belt tensioner 132 could be replaced with a push/pull switch coupled between the first and second ends 124, 126 of the belt 94. Therefore, depending on the direction of movement of the sliding door 24, the belt 94 would actuate the switch in a first direction or a second direction.

In operation, starting with the sliding door 24 in the close position, when the user desires to move the sliding door 24 to the open position the motor 92 is actuated to drive in a first direction producing drive torque which causes the spur gear 104 to rotate in a clockwise direction (when viewed from FIG. 3). Rotation of the spur gear 104 in the clockwise direction also causes the drive pulley 106 to rotate in the clockwise direction. Engagement between the drive pulley 106 and the belt 94 causes the belt 94 to move along the lower guide track 34 and around the driven pulley 114 in the clockwise direction. As the belt 94 moves in the clockwise direction, the second end 126 of the belt 94 is pulled to move the sliding door 24 rearwardly toward the open position. Referring to FIG. 7, pulling the second end 126 of the belt 94 extends the spring 158 in the second channel 140 until the end clamp 150 abuts the closed end 142 of the second channel 140. At the same time, the spring 156 in the first channel 138 shortens, thereby pulling the end clamp 148 and in turn the first end 124 of the belt 94 toward the open end 146 of the first channel 138, thus taking up the slack in the belt 94.

To close the sliding door 24, the motor 92 is actuated to drive in a second direction producing drive torque which causes the spur gear 104 to rotate in a counterclockwise direction (when viewed form FIG. 3). Rotation of the spur gear 104 in the counterclockwise direction also causes the drive pulley 106 to rotate in the counterclockwise direction. Engagement between the drive pulley 106 and the belt 94 causes the belt 94 to move along the lower guide track 34 and around the driven pulley 114 in the counterclockwise direction. As the belt 94 moves in the counterclockwise direction, the first end 124 of the belt 94 is pulled to move the sliding door 24 forwardly toward the close position. Referring to FIG. 6, pulling the first end 124 of the belt 94 extends the spring 156 in the first channel 138 until the end clamp 148 abuts the closed end 142 of the first channel 138. At the same time, the spring 158 in the second channel 140 shortens, thereby pulling the end clamp 150 and in turn the second end 126 of the belt 94 toward the open end 146 of the second channel 140, thus taking up the slack in the belt 94.

Alternatively, the sliding door 24 can be moved between the open and close positions manually. Starting with the sliding door 24 in the close position, when the sliding door 24 is manually moved rearwardly toward the open position the sliding door 24 pulls the first end 124 of the belt 94 causing the belt 94 to move along the lower guide track 34 in the clockwise direction. Pulling the first end 124 of the belt 94 extends the spring 156 in the first channel 138 until the end clamp 148 abuts the closed end 142 of the first channel 138. At the same time, the spring 158 in the second channel 140 shortens, thereby pulling the end clamp 150 and in turn the second end 126 of the belt 94 toward the open end 146 of the second channel 140, thus taking up the slack in the belt 94. As the end clamps 148, 150 move within the first and second channels 138, 140, the pins 172 slide along the linear body 168 of the respective potentiometers 164, 166. The potentiometers 164, 166 sense the end clamps 148, 150 in the unbalanced position and transmit a signal to the electronic controller 176 which, in turn, operates the motor 92 to overcome the motor drag and belt friction forces.

When the sliding door 24 is manually moved forwardly toward the close position the sliding door 24 pulls the second end 126 of the belt 94 causing the belt 94 to move along the lower guide track 34 in the counterclockwise direction. Pulling the second end 126 of the belt 94 extends the spring 158 in the second channel 140 until the end clamp 150 abuts the closed end 142 of the second channel 140. At the same time, the spring 156 in the first channel 138 shortens, thereby pulling the end clamp 148 and in turn the first end 124 of the belt 94 toward the open end 146 of the first channel 138, thus taking up the slack in the belt 94. As the end clamps 148, 150 move within the first and second channels 138, 140, the pins 172 slide along the linear body 168 of the respective potentiometers 164, 166. The potentiometers 164, 166 sense the end clamps 148, 150 in the unbalanced position and transmit a signal to the electronic controller 176 which, in turn, operates the motor 92 to overcome the motor drag and belt friction forces.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed:

1. A power drive system for moving a closure panel on a motor vehicle having an opening between an open position substantially clearing the opening and a close position substantially covering the opening, said power drive system comprising:

an elongated flexible drive member extending between first and second ends, said elongated flexible drive member operatively coupled to the closure panel and defining a path;

a motor operatively engaging said elongated flexible drive member for moving said elongated flexible drive member in a first direction and a second direction along said path to move the closure panel between the open and close positions;

a tensioner operatively coupled to each of said first and second ends of said elongated flexible drive member, wherein manual movement of the closure panel causes movement of said elongated flexible drive member in said first or second direction and said tensioner allows one of said first and second ends of said elongated flexible drive member to move in said first direction while the other of said first and second ends moves in said second direction generally opposite said first direction, thereby causing relative movement between said first and second ends of said elongated flexible drive member;

at least one sensor mounted adjacent to said elongated flexible drive member, said at least one sensor sensing said relative movement between said first and second ends of said elongated flexible drive member in response to manual movement of the closure panel, whereby said at least one sensor creates a feedback signal; and an electronic controller electrically connected to said at least one sensor for receiving said feedback signal and for operating said motor to overcome forces created during manual movement of the closure panel.

2. A power drive system for moving a closure panel on a motor vehicle having an opening between an open position substantially clearing the opening and a close position substantially covering the opening, said power drive system comprising:

a guide track adapted to be mounted to the vehicle body adjacent the opening and extending therealong;

a hinge member including a first end adapted for mounting to the closure panel and a second end operatively coupled to said guide track;

a belt extending between first and second ends operatively coupled to the closure panel, said belt defining a path around said guide track;

a motor operatively engaging and driving said belt along said path in either a first direction or a second direction in order to move the closure panel between the open and close positions;

a spring coupled between each of said first and second ends of said belt and. said hinge member, wherein manual movement of the closure panel between either of the open and close positions causes movement of said belt in said first or second direction thereby pulling one of said first or second ends of said belt and extending one of said springs while the other of said springs pulls the other of said first or second ends of said belt, thereby resulting in relative movement between said first and second ends of said belt;

a pair of sensors mounted to said hinge member, said pair of sensors sensing said relative movement between said first and second ends of said belt in response to manual movement of the closure panel, whereby said sensors create a feedback signal; and an electronic controller electrically connected to said pair of sensors for receiving said feedback signal and for operating said motor to overcome a motor back-driving force and belt friction forces created during manual movement of the closure panel.

3. A power drive system as set forth in claim 2 wherein said motor is operated such that said motor overcomes said motor back-driving force, said belt friction forces, and provides a force assist to further reduce user efforts during manual movement of the closure panel.

4. A power drive system as set forth in claim 3 wherein said pair of sensors is a pair of potentiometers, each one of said pair of sensors is operatively coupled between one of said first and second ends of said belt and said hinge member.

5. A power drive system for moving a closure panel on a motor vehicle having an opening between an open position substantially clearing the opening and a close position substantially covering the opening, said power drive system comprising:

a guide track adapted to be mounted to the vehicle body adjacent the opening and extending therealong;

a hinge member including a first end adapted for mounting to the closure panel and a second end operatively coupled to said guide track;

a belt extending between first and second ends operatively coupled to the closure panel, said belt defining a path around said guide track;

a motor operatively engaging and driving said belt along said path in either a first direction or a second direction to move the closure panel between the open and close positions; and a differential belt tensioner having a housing mounted to said hinge member, said differential belt tensioner including a spring coupled between each of said first and second ends of said belt and said hinge member respectively, wherein movement of the closure panel between either of the open and close positions causes movement of said belt in said first or second direction thereby pulling one of said first or second ends of said belt and extending one of said springs while the other of said springs pulls the other of said first or second ends of said belt to take up slack in said belt; and a pair of potentiometers mounted to said housing and operatively coupled to said first and second ends of said belt thereby sensing relative movement between said first and second ends of said belt during manual movement of the closure panel whereby said pair of potentiometers create a feedback signal.

6. A power drive system as set forth in claim 5 wherein said differential belt tensioner includes a pair of end clamps slidably coupled to said housing and retaining said first and second ends of said belt therein, and wherein said springs are coupled between each of said pair of end clamps and said hinge member.

7. A power drive system as set forth in claim 6 wherein said pair of potentiometers is mounted to said housing and operatively coupled to said pair of end clamps.

8. A power drive system as set forth in claim 7 including an electronic controller electrically connected to said pair of potentiometers for receiving said feedback signal and for operating said motor to overcome a motor back-driving force and belt friction forces during manual movement of the closure panel.

* * * * *